(12) United States Patent
Lapinski et al.

(10) Patent No.: US 9,091,390 B1
(45) Date of Patent: Jul. 28, 2015

(54) SLIDE-ON DEVICE FOR GOLF CARTS

(71) Applicant: Lapinski Sports, Inc., El cajon, CA (US)

(72) Inventors: Scott C. Lapinski, El Cajon, CA (US); Mark W. Lapinski, El Cajon, CA (US)

(*) Notice: Subject to any disclaimer, the term of this patent is extended or adjusted under 35 U.S.C. 154(b) by 0 days.

(21) Appl. No.: 14/298,812

(22) Filed: Jun. 6, 2014

(51) Int. Cl.
| | |
|---|---|
| *B60R 9/00* | (2006.01) |
| *F16M 13/02* | (2006.01) |
| *H04R 1/02* | (2006.01) |
| *B60R 11/00* | (2006.01) |

(52) U.S. Cl.
CPC ............ *F16M 13/022* (2013.01); *H04R 1/028* (2013.01); *B60R 9/00* (2013.01); *B60R 2011/0059* (2013.01); *B60R 2011/0077* (2013.01); *Y10S 224/929* (2013.01)

(58) Field of Classification Search
USPC .............. 224/274, 545, 555, 558, 567, 901.8, 224/929; 248/219.4
See application file for complete search history.

(56) References Cited

U.S. PATENT DOCUMENTS

| | | | | |
|---|---|---|---|---|
| 2,580,985 | A * | 1/1952 | Wooden .................... | 224/558 |
| 2,628,054 | A * | 2/1953 | Fazakerley ................. | 248/311.2 |
| D176,627 | S * | 1/1956 | Nash .............................. | D34/27 |
| 4,449,310 | A | 5/1984 | Kline | |
| 4,981,243 | A * | 1/1991 | Rogowski ..................... | 224/431 |
| 5,387,010 | A * | 2/1995 | Mohr .............................. | 281/43 |
| 5,839,167 | A | 11/1998 | Wagner | |
| 5,983,518 | A * | 11/1999 | Ellenburg ....................... | 34/106 |
| 6,237,197 | B1 | 5/2001 | Donahue | |
| 6,634,528 | B2 | 10/2003 | Hurtgam | |
| 6,694,526 | B1 | 2/2004 | Tate | |
| 6,869,120 | B2 * | 3/2005 | Johnson et al. ............. | 296/37.12 |
| 7,100,230 | B2 | 9/2006 | Hillenbrand | |
| 7,177,420 | B2 * | 2/2007 | Carter ........................... | 379/447 |
| 7,926,149 | B2 | 4/2011 | Weston | |
| 8,206,236 | B1 | 6/2012 | Neu | |
| 2002/0138953 | A1 * | 10/2002 | Passafiume ..................... | 24/306 |
| 2004/0182897 | A1 | 9/2004 | Andrews | |
| 2008/0083131 | A1 * | 4/2008 | Wess .............................. | 34/239 |
| 2009/0100699 | A1 * | 4/2009 | Hasler ............................ | 34/106 |

* cited by examiner

*Primary Examiner* — Justin Larson
(74) *Attorney, Agent, or Firm* — IDP Patent Services; Olav M. Underdal

(57) ABSTRACT

A slide-on device for mounting on a frame of a structure, including a support column of the frame of a golf cart, includes a first flange, a second flange, and a rear side, such that the first flange slides on one side of the frame, and the second flange slides on the other side of the frame, so that the slide-on device is held in place on the frame between the flanges. The slide-on device can be adapted to fit on different types of frames, including both 1" and 1¼" standard support columns of golf carts. Accessories, including a wireless speaker, can be attached to the slide-on device with an attachment mechanism, including a hook-and-loop fastener. Also disclosed is a method for using a slide-on device with an attached wireless loudspeaker.

19 Claims, 7 Drawing Sheets

SLIDE-ON DEVICE FOR GOLF CARTS

CROSS-REFERENCE TO RELATED APPLICATIONS

N/A

FIELD OF THE INVENTION

The present invention relates generally to the field of devices for attaching accessories to structures, and more particularly to devices that can attach to the frame of a golf cart.

BACKGROUND OF THE INVENTION

During the play of golf, a plurality of different golf related accessories may be used as in integral part of the game. In many cases, a player will employ a golf cart for transportation on the golf course, and may further use a golf bag for storage of golf clubs, tees, cloths, etc.

A golf player may often also carry a mobile device, such as a mobile phone. Often such a mobile phone will be carried in a pocket. However, if the golf player wants to listen to music, radio or other audio while playing golf, this will generally prove impractical, as wearing a wired or wireless speaker headphones in most cases would be disruptive to the game. On the other hand, there is no easy way to mount speakers in a typical golf cart.

As such, considering the foregoing, it may be appreciated that there continues to be a need for novel and improved devices and methods for mounting devices to a golf cart.

SUMMARY OF THE INVENTION

The foregoing needs are met, to a great extent, by the present invention, wherein in aspects of this invention, enhancements are provided to existing models of devices for attaching to a golf cart.

In an aspect, a slide-on device can be mounted on a frame of a structure, such as a support column of the frame of a golf cart, in such manner that a first flange of the slide-on device can slide on one side of the support column, and further such that a second flange of the slide-on device can slide on the other side of the slide-on device, such that the slide-on device is held in place on the support column.

In a related aspect, the frame can be a left or right front roof support column of a golf cart.

In yet a related aspect, outer surfaces of the flanges of the slide-on device can be configured with an attachment mechanism, to allow external devices to be attached to the slide-on device. Thus, as an example, a wireless speaker can be mounted on the slide-on device with a hoop and loop fastener.

In various related aspects, the slide-on device can be configured to conform to various frames and support columns, including to Standard rectangular support columns of golf carts with a width of 1" or 1¼". In such a further related aspect, a slide-on device can be configured with an inner opening between the flanges of 1" and an outer opening of 1¼", such that the slide-on device can be mounted on golf carts with a standard rectangular support columns of either 1" or 1¼".

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
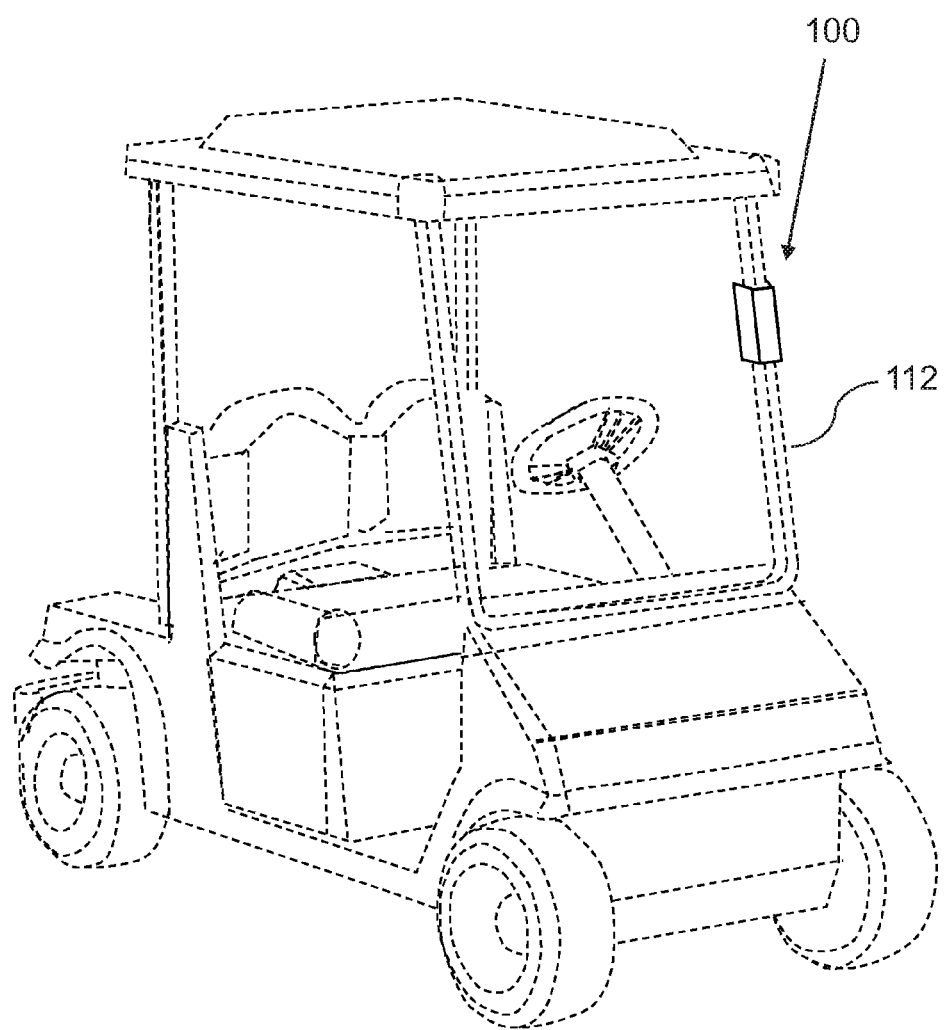
FIG. 1 is a perspective view of a slide-on device mounted on a golf cart, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following we describe the structure of such an embodiment in the form of a slide-on device 100 with reference to FIG. 1, in such manner that like reference numerals refer to like components throughout; a convention that we shall employ for the remainder of this specification.

In an embodiment, as illustrated in FIG. 1, a slide-on device 100 can be mounted on a frame of a structure, such as a support column 112 of the frame of a golf cart 110.

Figure 2:
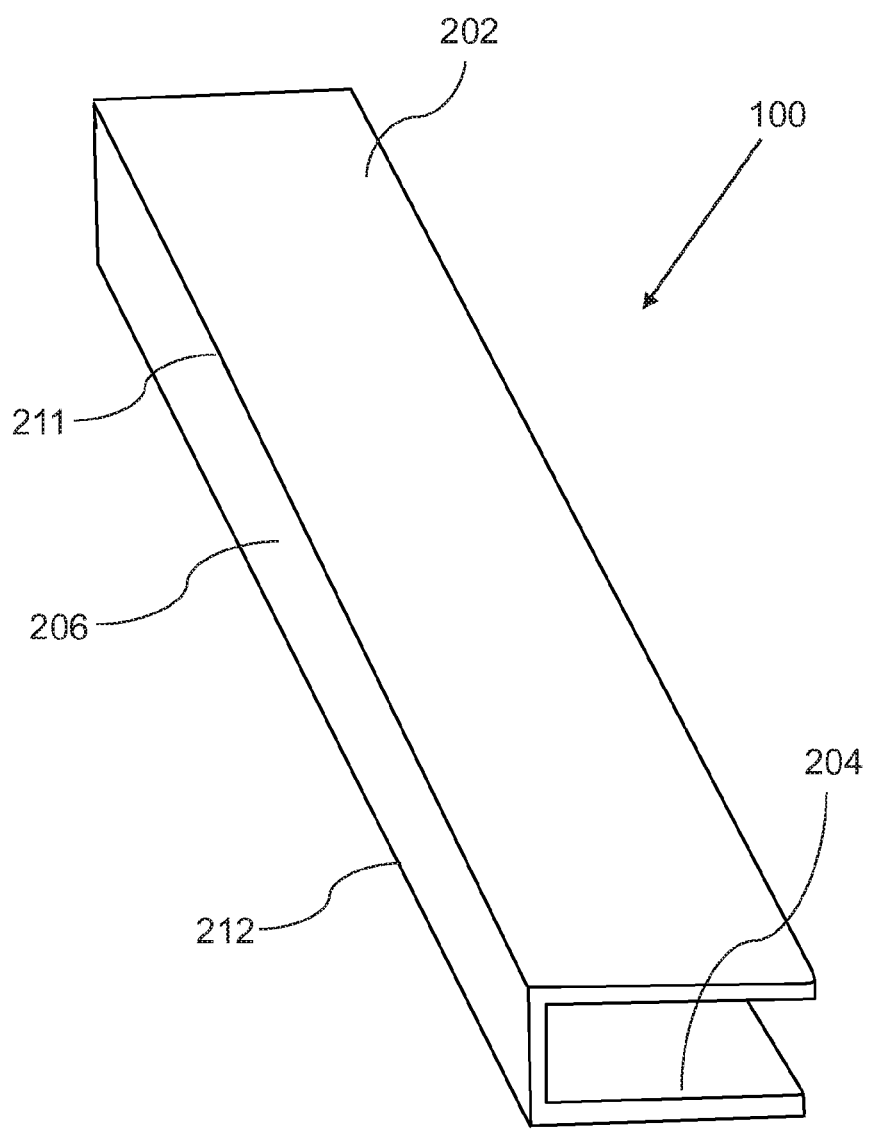
FIG. 2 is a perspective view of a slide-on device, according to an embodiment of the invention.

In an embodiment, as illustrated in FIG. 2, a slide-on device 100 can comprise:
   a) A first flange 202, wherein the first flange is an elongated rectangular piece;
   b) A second flange 204, wherein the first flange is an elongated rectangular piece, which typically will be symmetrical and of identical construction as the first flange 202;
   c) A rear side 204, which is an elongated rectangular piece, to which along a first long side 211 of the rear side 204 is connected along a rear long side of the first flange 202; and further a second long side 212 of the rear side 204 is connected along a rear long side of the second flange.

In a related embodiment, the first long side 211 of the rear side 204 can be pendicularly connected to the rear long side of the first flange 202; and the second long side 212 of the rear side 204 can be pendicularly connected to a rear long side of the second flange. FIGS. 1, 2, 3, 4, 5, 6 and 8 shows embodiments where the flanges 202 204 are pendicularly connected to the rear side.

Figure 3:
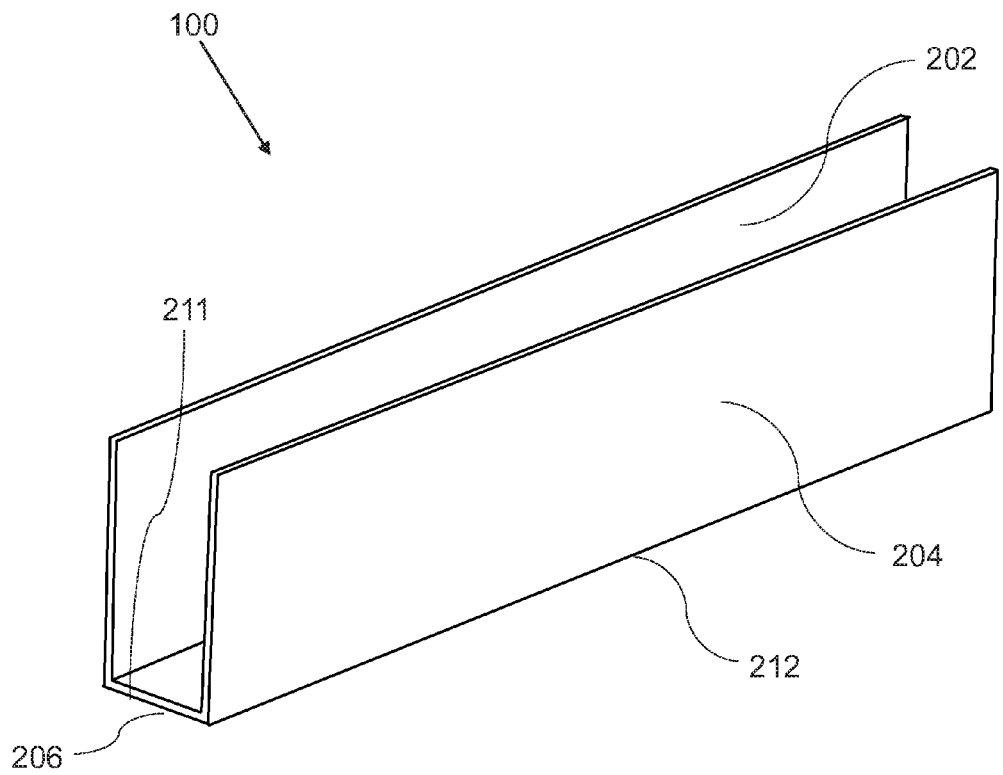
FIG. 3 is a perspective view of a slide-on device, according to an embodiment of the invention.

In a related embodiment, FIG. 3 illustrates another perspective view of the slide-on device 100.

Figure 4:
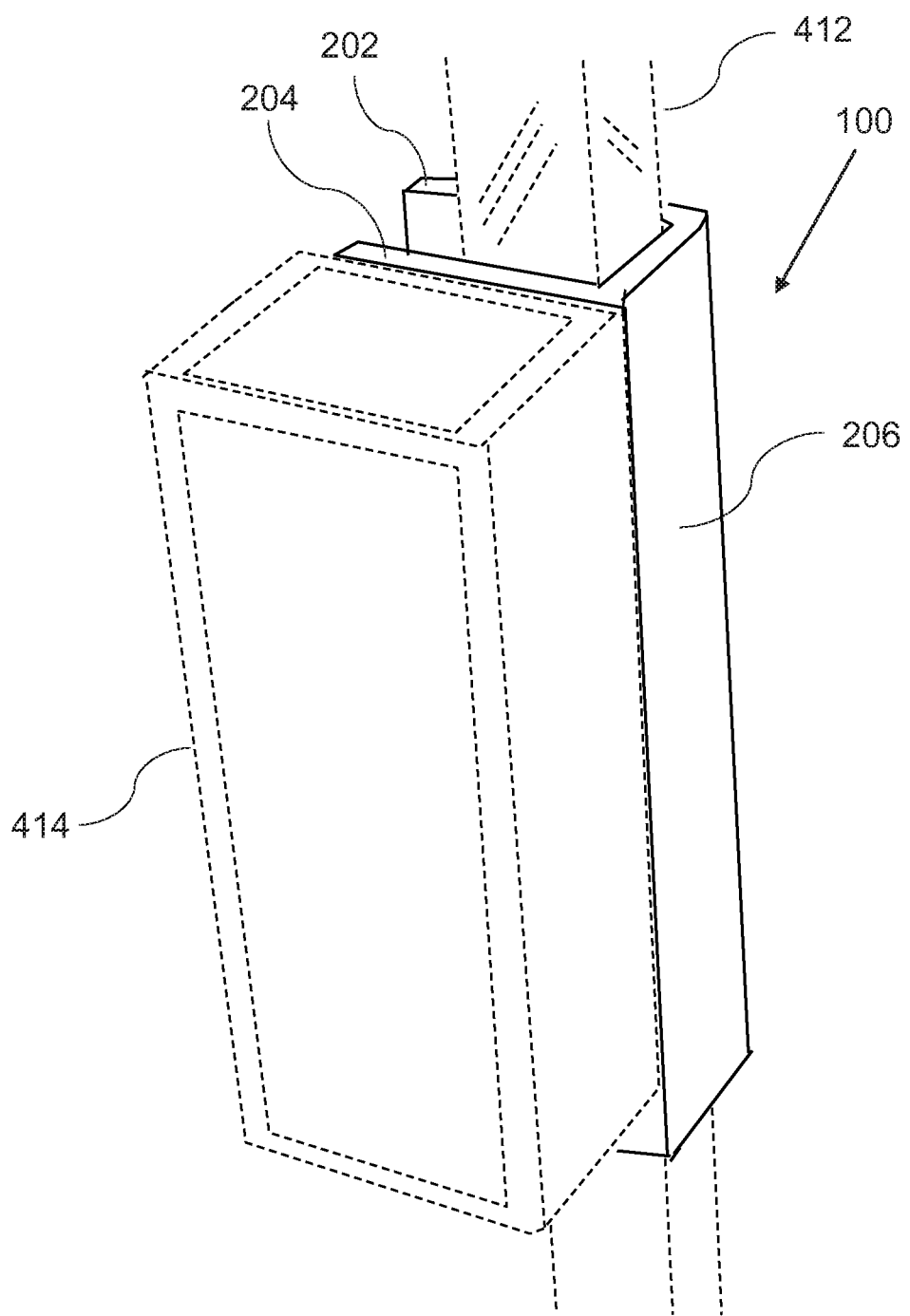
FIG. 4 is an inner-side perspective view of a slide-on device mounted on a support column of a golf cart, according to an embodiment of the invention.

In a related embodiment, as illustrated in FIG. 4, the slide-on device 100 can be mounted on a rectangular column 412, where it slides on from the side of the rectangular pole.

In a related embodiment, the rectangular column can be a rectangular support column 112 of a golf cart. The rectangular support column can for example be a left or right front roof support column.

In a related embodiment, the outer surfaces of the first and second flange can be configured with an attachment mechanism, to allow external devices to be attached to the slide-on device 100. The attachment mechanism can for example include:
   a) A hook and loop fastener, for example in the form of a patch with an adhesive surface;
   b) A sticky surface patch, which can be secured to the outer flange surface, thereby allowing a device to be connected to the flange surface.
   c) A suction cup fastener;
   d) A clip fastener, which is secured to the outer flange surface In a related embodiment, FIG. 4 illustrates an inner side perspective view of a slide-on device 100, mounted on the front left roof support column of a golf cart, such that on the clip on device 100 is further attached a loudspeaker 414.

In a further related example embodiment, illustrating use of the slide-on device 100, the loudspeaker 414 can be a battery powered wireless loudspeaker, which can utilize Bluetooth communication, or other wireless protocol, such as ZigBee, WIFI, etc., and can thereby play music or radio, or other audio programming via a connection to a mobile device, such as a mobile phone, which is carried by a driver or occupant of the golf cart. Alternatively, the mobile device can be attached with a hook and loop fastener 514, on the outer surface of the forward facing flange, as shown in FIG. 5, so that both the mobile device and the loudspeaker 414 are attached to the clip on device 100.

Figure 5:
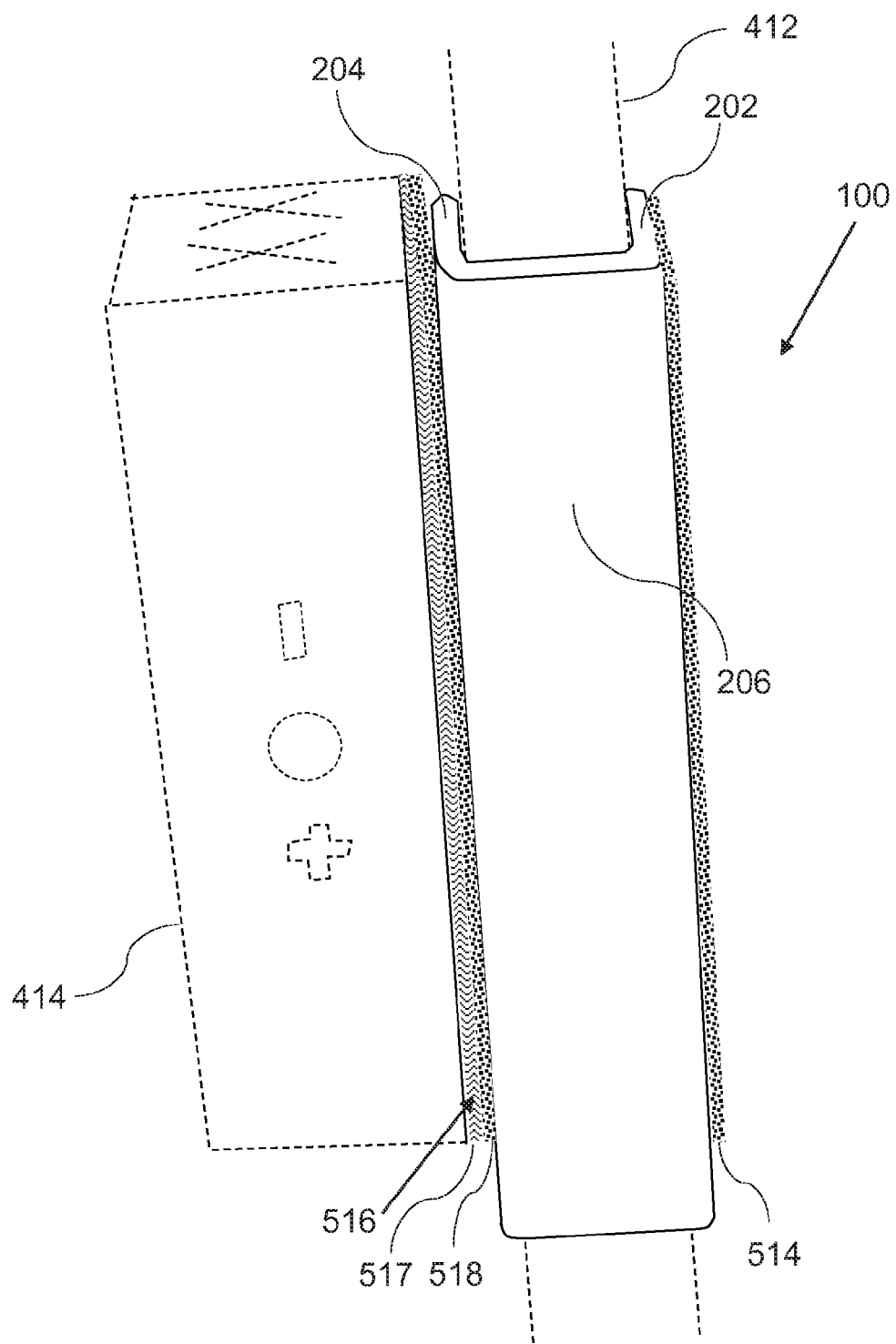
FIG. 5 is a side view of a slide-on device mounted on a support column of a golf cart with a loudspeaker attached, according to an embodiment of the invention.

In a related embodiment, FIG. 5 illustrates a side view of the slide-on device 100 mounted on a front support column 412 of a golf cart, with a loudspeaker 414 attached to a rear flange of the slide-on device, via use of a hook and loop fastener 516.

In a related embodiment, FIG. 5 illustrates a side view of a slide-on device 100, mounted on a support column 412, such that the clip on device 100 is further configured with a rear loop fastener 518 on the outer surface of the rear facing flange 204; which attaches to a hook fastener 517, which is further attached to a loudspeaker 414. FIG. 5 also illustrates a front loop fastener 514, which can be used for attaching other devices on the front of the slide-on device 100.

In a further related embodiment, the slide-on device 100, can be mounted with front and rear hook fasteners, instead of front and rear loop fasteners 518 514.

In a related embodiment, the slide-on device 100 can be made of a plastic material, such that the slide-on device is injection molded in one piece. Alternatively, it can be assembled from separate plastic pieces. A suitable plastic material can for example be a rigid polyvinyl chloride plastic, such as a plastic of the brand and type Geon Vinyl Rigid Extrusion L6256.

In another related embodiment, the slide-on device can be made of a metal alloy. In further related embodiments, the metal alloy can be covered with a plastic, rubber, or other soft surface.

In a related example embodiment, the slide-on device 100 can have a length of 7", a depth of each flange of 2½", and a width or opening between each flange of uniformly 1", such that the flanges 202 204 are perpendicular to the back side. These dimension can allow the slide-on device 100 to be mounted on a standard one inch rectangular column, such as a one inch rectangular metal support column normally used in golf carts.

In most cases, for example when the slide-on device 100 is manufactured from plastic, the slide-on device 100 will have sufficient flexibility so that when the slide-on device is manufactured with an opening between each flange of 1", it will be able to slide on a standard 1" rectangular column. In cases where the slide-on device 100 is manufactured such that it is relatively stiff, then the opening between each flange can have a small additional tolerance width, for example in the range of 5/1000" to 20/1000". In such a case, the opening between the flanges 202 204 can for example have a width of 1.01".

Figure 6:
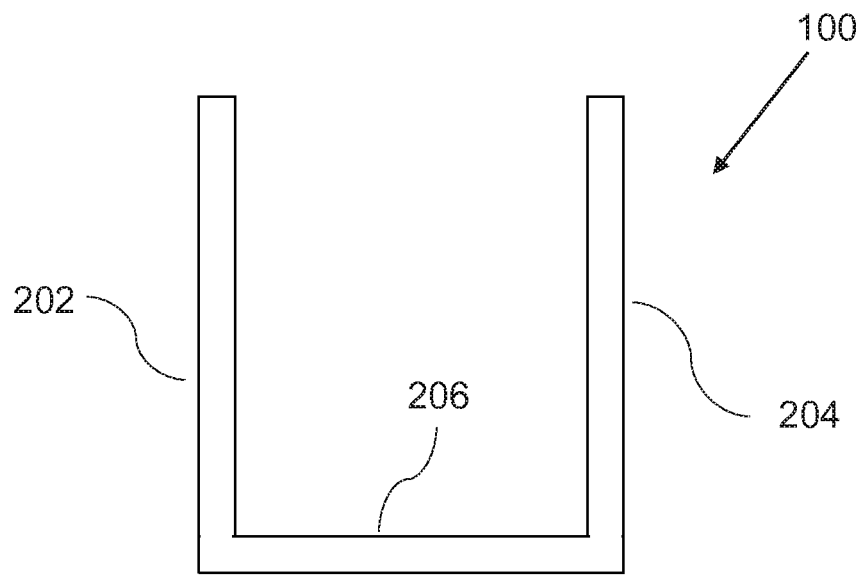
FIG. 6 is a cross-sectional view of a slide-on device, according to an embodiment of the invention.

In a related embodiment, FIG. 6 illustrates a cross-sectional view of a slide-on device 100, wherein the flanges 202 204 are perpendicular to the rear side 206.

Figure 7:
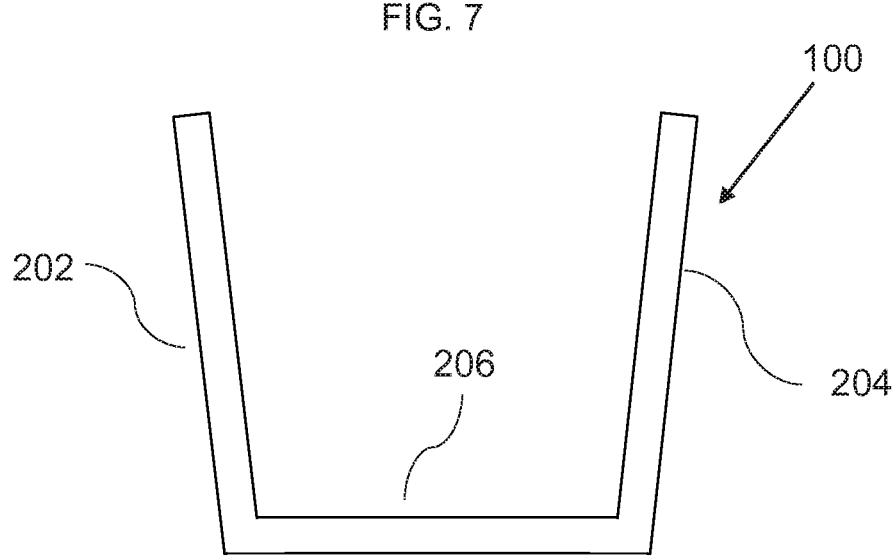
FIG. 7 is a cross-sectional view of a slide-on device, according to an embodiment of the invention.

In an alternative embodiment, illustrated in FIG. 7, the slide-on device can have the flanges 202 204 mounted so they are not perpendicularly mounted, but have a wider opening, than the width of the rear side, such that the opening for example can be 1.25" on the open end of the flanges 202 204, reducing to 1" where the flanges 202 204 connect with the back side. In this alternative embodiment, the slide-on device 100 can be used with both a standard 1" rectangular column and with a 1¼" rectangular column.

Figure 8:
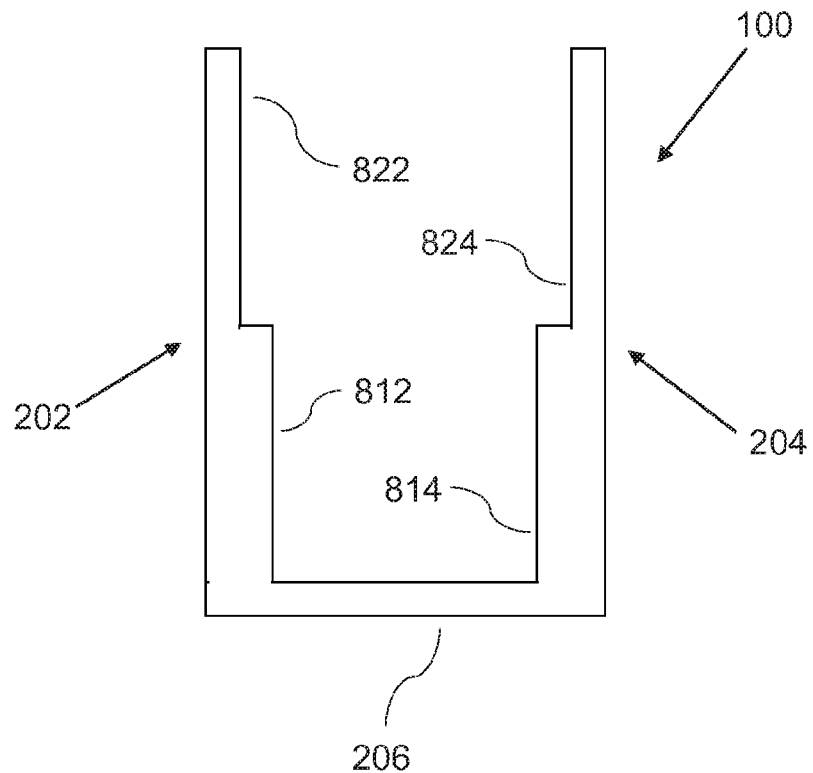
FIG. 8 is a cross-sectional view of a slide-on device, according to an embodiment of the invention.

In an alternative embodiment, illustrated in FIG. 8, the slide-on device can have the flanges 202 204 perpendicularly mounted, such that
   a) an inner part of the opening between the flanges 202 and 204, from a first inner section 812 of the first flange 202 to a second inner section 814 of the second flange 204 has an inner opening, and
   b) an outer part of the opening between the flanges 202 and 204, from a first outer section 822 of the first flange 202 to a second outer section 824 of the second flange 204 has an outer opening;
      wherein both the inner opening and the other opening have uniform width of the opening between the flanges, and wherein further the inner opening is narrower than the outer opening.

In a further related example embodiment, the inner opening can be 1", and the outer opening can be 1¼". In this example embodiment, the slide-on device 100 can be used with both a standard 1" rectangular column and with a 1¼" rectangular column.

Figure 9:
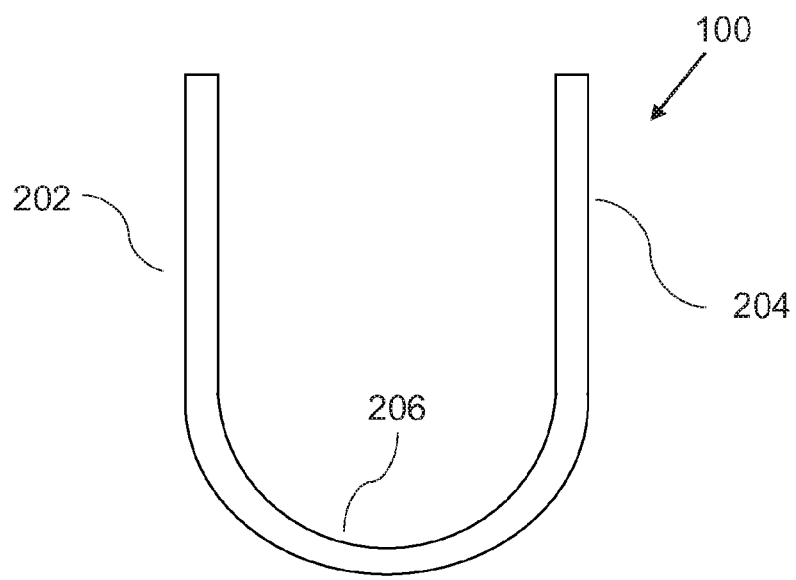
FIG. 9 is a cross-sectional view of a slide-on device, according to an embodiment of the invention.

In yet an alternative embodiment, FIG. 9 illustrates a cross-sectional view of a slide-on device 100, wherein the flanges 202 204 are mounted via a curved rear side 206. In this embodiment, the slide-on device 100 can be manufactured from a rectangular piece of metal or plastic, which is bent around a cylinder with a diameter of 1" or 1¼", such that the flanges 202 204 and the rear side 206, are integral parts of one piece of plastic or metal.

In an embodiment, the slide-on device 100 can flexible such that flanges 202 204 will allow for widening of the opening, whereby the slide-on device can adapt for mounting on different size columns.

In a related embodiment, the slide-on device 100 can be made of soft gel material with a sticky adhesive surface, whereby the slide-on device 100 can fit different shapes and sizes of columns and other constructions.

In a related embodiment, a first member and a second member of the slide-on device 100, such as a first and second flange 202 204, can be configured with a protruding shape to match a structure, such that the first and the second member can slide on to a first and second side of the structure, such that a part of the structure is between the first member and the second member, such that the slide-on device 100 is secured to the structure.

In a related embodiment, a method for using a slide-on device with an attached battery powered wireless loudspeaker, can comprise:
 a) sliding the slide-on device onto a support column, such that a first flange of the slide-on device slides onto and over a first side of the support column, and a second flange of the slide-on device slides onto and over a second side of the support column, until the slide-on device is firmly secured on the support column; and
 b) listening to audio, such as music or radio programming, from the wireless loudspeaker.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A slide-on device for mounting on a frame of a golf cart to allow attachment of accessories, comprising: a) a first flange; and b) a second flange; wherein the first flange is connected with the second flange, such that there is an opening between the first flange and the second flange, whereby the slide-on device is configured to slide on to the frame of the structure, such that the first flange is on a first side of the frame, and the second flange is on a second side of the frame; wherein the opening has a uniform width along an entire length and depth of the opening; wherein the first flange and the second flange are elongated along a length of the slide-on device; and wherein mounting and securing functions of the slide-on device are provided solely by the uniform opening between the flanges.

2. The slide-on device of claim 1, further comprising a rear side, such that along a first long side of the rear side is connected a rear long side of the first flange, and further along a second long side of the rear side is connected a rear long side of the second flange.

3. The slide-on device of claim 1, wherein the first flange is parallel to the second flange.

4. The slide-on device of claim 1, wherein the first flange is an elongated substantially rectangular piece.

5. The slide-on device of claim 1, wherein the second flange is an elongated substantially rectangular piece.

6. The slide-on device of claim 1, wherein an outer surface of the slide-on device further comprises an attachment mechanism.

7. The slide-on device of claim 6, wherein the attachment mechanism is a hook or loop fastener.

8. The slide-on device of claim 6, further comprising a battery powered wireless loudspeaker, such that the battery powered wireless loudspeaker is attached to the outer surface with the attachment mechanism.

9. The slide-on device of claim 1, wherein the slide-on device is made of a plastic material.

10. A slide-on device for mounting on a frame of a golf cart, wherein the slide-on device comprises two protruding members that are part of the slide-on device, such that a first member of the slide-on device is configured to slide on a first side of the frame, and a second member is configured to slide on a second side of the frame, such that a part of the frame is between the first member and the second member, such that the slide-on device is secured in position on the frame, wherein an opening between the first member and the second member has a uniform width along an entire length and depth of the opening; wherein the first member and the second member are elongated along a length of the slide-on device; and wherein mounting and securing functions of the slide-on device are provided solely by the uniform opening between the first and second members.

11. The slide-on device of claim 10, wherein the first member is an elongated substantially rectangular piece, and the second member is an elongated substantially rectangular piece.

12. The slide-on device of claim 10, wherein an outer surface of the slide-on device further comprises an attachment mechanism.

13. The slide-on device of claim 10, wherein the attachment mechanism is a hook or loop fastener.

14. A method for using a slide-on device with an attached battery powered wireless loudspeaker, wherein an opening between a first flange of the slide-on device and a second flange of the slide-on device has a uniform width along an entire length and depth of the opening, and wherein the first flange and the second flange are elongated along a length of the slide-on device, the method comprising: a) sliding the slide-on device onto a golf cart frame column, such that the first flange of the slide-on device slides onto and over a first side of the column, and the second flange of the slide-on device slides onto and over a second side of the column, until the slide-on device is firmly secured on the column by the uniform opening alone; and b) listening to audio from the wireless loudspeaker.

15. The method for using a slide-on device of claim 14, wherein the first flange is an elongated substantially rectangular piece.

16. The method for using a slide-on device of claim 14, wherein the second flange is an elongated substantially rectangular piece.

17. The method for using a slide-on device of claim 14, wherein an outer surface of the slide-on device further comprises an attachment mechanism, such that the battery powered wireless loudspeaker is attached to the outer surface with the attachment mechanism.

18. The method for using a slide-on device of claim 17, wherein the attachment mechanism is a hook or loop fastener.

19. The method for using a slide-on device of claim 14, wherein the slide-on device is made of a plastic material.

\* \* \* \* \*